(12) United States Patent
Henniger

(10) Patent No.: US 7,533,178 B2
(45) Date of Patent: May 12, 2009

(54) RESUMING A COMPUTING SESSION WHEN REBOOTING A COMPUTING DEVICE

(75) Inventor: Mickey Henniger, Buchanan Dam, TX (US)

(73) Assignee: Cisco Technology, Inc., San Jose, CA (US)

( * ) Notice: Subject to any disclaimer, the term of this patent is extended or adjusted under 35 U.S.C. 154(b) by 235 days.

(21) Appl. No.: 11/591,249

(22) Filed: Oct. 31, 2006

(65) Prior Publication Data

US 2008/0104252 A1    May 1, 2008

(51) Int. Cl.
*G06F 15/16*    (2006.01)
*G06F 12/00*    (2006.01)
(52) U.S. Cl. .......................................... 709/227; 713/2
(58) Field of Classification Search ......... 709/227–229, 709/203; 713/1, 2
See application file for complete search history.

(56) References Cited

U.S. PATENT DOCUMENTS

| | | | |
|---|---|---|---|
| 6,526,447 | B1 * | 2/2003 | Giammaria ................. 709/232 |
| 6,880,013 | B2 * | 4/2005 | Kashyap .................... 709/227 |
| 7,174,451 | B2 * | 2/2007 | Zimmer et al. ................. 713/2 |
| 2002/0087697 | A1 * | 7/2002 | Kashyap .................... 709/227 |
| 2003/0208675 | A1 * | 11/2003 | Burokas et al. ................ 713/1 |
| 2004/0253956 | A1 * | 12/2004 | Collins ....................... 455/445 |

OTHER PUBLICATIONS

Ikebe, Takashi, "[cgl_discussion] Re: [cgl_tech_board] Use Case Session Takeover", Open Source Development Labs 2004, written Mar. 23, 2005, private discussion group on <https://old.linux-foundation.org>, web page, 3 pages.
Snoeren, Alex C, et al., "Session-Based Mobility", MIT Laboratory for Computer Science, power point presentation, retrieved from website <http://nms.csail.mit.edu/~snoeren/talks/sbm/sld001.htm>, May 22, 2002, 22 pages.
Snoeren, Alex C, et al., "Fine-Grained Failover Using Connection Migration", MIT Laboratory for Computer Science Technical Report, retrieved from webpage <http://nms.lcs.mit.edu/papers/migrate-failover.pdf>, Mar. 2001, 12 pages.

* cited by examiner

*Primary Examiner*—Zarni Maung
(74) *Attorney, Agent, or Firm*—Hickman Palermo Truong & Becker LLP

(57) ABSTRACT

Methods and apparatus are disclosed for transparently resuming the network connection after a reset or reboot. In one aspect a data processing apparatus comprises an operating system unit configured to create and store state information comprising one or more parameters for a network connection between a first computing device and a second computing device; a management interface unit configured to receive a request to reboot the first computing device; and host reset session resumption logic configured to store, in response to the request, the state information in a particular location in a memory of the first computing device, to initiate a reboot of the first computing device, to retrieve the state information from the particular location in memory, and to request resuming data communications over the network connection based on the retrieved state information.

37 Claims, 4 Drawing Sheets

US 7,533,178 B2

RESUMING A COMPUTING SESSION WHEN REBOOTING A COMPUTING DEVICE

FIELD OF THE INVENTION

The present invention generally relates to data processing. The invention relates more specifically to techniques for resuming a computing session after an interruption occurs in the course of rebooting a computing device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The TELNET network protocol is defined in Request for Comments (RFC) 854 and RFC 855 of the Internet Engineering Task Force (IETF) and provides a general-purpose communication facility for transmitting and receiving data between a terminal and a network device such as a router or switch. Using TELNET, an operator can establish a connection to the device and issue commands in a command-line interface (CLI) language to the device. If the operator issues a command for the device to reboot, the device normally resets the TELNET communication port, causing disconnection of the TELNET session. Present techniques do not provide a convenient way to keep a TELNET session operational during a device reboot.

Modern computer networks rely on network transmission protocols for use in the exchange of information between clients and hosts. TCP is a transport layer protocol and is defined in RFC 793 and RFC 2001. Under TCP, a transmitter has the burden of flow control in response to network problems, including detecting network congestion and deciding when to retransmit.

In general, servers perform most transmitting, so a TCP process on a server performs most flow control decisions. Implementing flow control involves storing and maintaining state data describing the data packets already sent, tracking an amount of time taken to receive an acknowledgement from the client that particular data packets have been received, and scheduling checks to see if no acknowledgement has been received within a time-to-live value that is specified for each packet.

A disadvantage in the current implementation of TCP arises when a TCP connection is interrupted due to a reset or reboot. In the event of a reset or reboot, the TCP connection between the client and host times out, and the state of the TCP session is lost. In such cases, the reset or reboot is handled by invoking a new TCP connection at some point in the future in order to re-connect the client and host.

If the TCP connection is protected, then invoking a new TCP connection forces a re-authentication of the TCP connection. An authentication process determines whether a device requesting access to the network, or to a particular resource, actually is the device that it purports to be. If the device is authenticated, then depending on its identity, role, and other policy data, the device may be permitted to access the network, or selected resources within the network.

Additionally, upon interruption of a stateful TCP connection, involving a series of commands within a transaction, the location within the transaction is lost. The entire transaction must be performed again. For example, if a connection is lost during a database update transaction due to a reset or reboot, the update cannot continue, and the entire update transaction must be re-executed.

One approach used to relieve the TCP resumption issue has been to modify the TCP protocol itself to include a "migrate" request for handling resumption of existing TCP connections, as described in A. Snoeren et al., "Fine-Grained Failover Using Connection Migration," MIT Laboratory for Computer Science, available online in the file "migrate-failover.pdf" in the folder/papers of the Internet domain "nms.lcs.mit.edu". The "migrate" request effectively moves a connection to accomplish failover.

However, extending the TCP protocol to include such a "migrate" request to accomplish session resumption generally requires modifying software programs hosted on client devices that implement the TCP protocol. In many cases, such modification is not desirable or feasible because of the large number of deployed client devices.

BRIEF DESCRIPTION OF THE DRAWINGS

This present invention is illustrated by way of example, and not by way of limitation, in the figures of the accompanying drawings and in which like reference numerals refer to similar elements and in which.

DETAILED DESCRIPTION

Figure 1A:
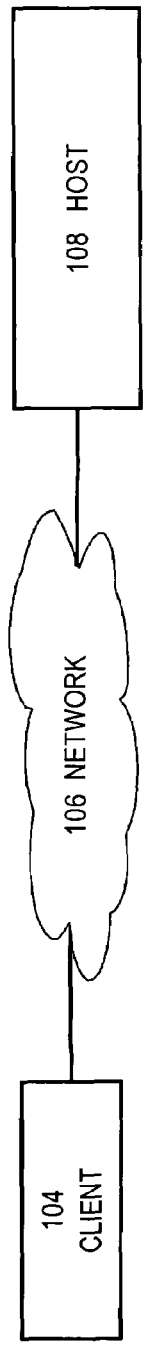
FIG. 1A is a block diagram of an example network arrangement.

Techniques are disclosed for resuming a computing session when rebooting a computing device. One aspect provides a method, apparatus and system for resuming TCP network session when the session-based connection has been interrupted. However, embodiments are not limited to use with TCP. In the following description, for the purpose of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Implementation Mechanisms-Hardware Overview |
| 4.0 | Extension and Alternatives |

1.0 General Overview

Methods and apparatus are disclosed for transparently resuming the network connection after a reset or reboot. The needs identified in the foregoing Background, and other needs and objects that will become apparent from the following description, are achieved in the present invention, which comprises, in one aspect, a data processing apparatus comprising an operating system unit configured to create and store state information comprising one or more parameters for a network connection between a first computing device and a second computing device; a management interface unit configured to receive a request to reboot the first computing device; and host reset session resumption logic configured to store, in response to the request, the state information in a particular location in a memory of the first computing device, to initiate a reboot of the first computing device, to retrieve the state information from the particular location in memory, and to request resuming data communications over the network connection based on the retrieved state information.

In one feature the operating system unit is configured to set a flag that specifies that the stored state information is stored, and wherein the host reset session resumption logic is configured to determine whether the state information is stored and to test whether the flag is set. In another feature the management interface unit is configured to receive the request to reboot the first computing device from the second computing device over the network connection.

In a further feature the host reset session resumption logic is configured to receive a signal from the second computing device after initiating the reboot of the first computing device, and the host reset session resumption logic is configured to retrieve and to request resuming only in response to receiving the signal. In yet another feature the host reset session resumption logic is configured to store, retrieve and resume before a timeout period of a network protocol that is used for the network connection.

In yet another feature, the host reset session resumption logic is configured to store the state information in a particular location in RAM that is not erased during the performing of the reboot. In still another feature, the host reset session resumption logic is configured to send a KEEPALIVE message after receiving the request.

In various embodiments, the apparatus comprises any one of a router, switch, server, IP phone, or a communicating device that performs stateful connection services.

In still another feature, the host reset session resumption logic is configured to request creating a TCP control block and to store the one or more parameters of the retrieved state information in the TCP control block. In various embodiments, the state information includes any one of a transport layer protocol layer state, a SSH protocol layer state and a SSL protocol layer state. Further, the state information of any other stateful communications protocol can be used.

In other aspects, the invention provides a method, means, and computer-readable medium providing session resumption functions. The foregoing provides merely an example general overview that does not limit or restrict the scope of the invention as stated in the appended claims.

2.0 Structural and Functional Overview

Data communication sessions between a client device and a host device based on network connections may be interrupted due to a reset or reboot operation that a user invokes through a management interface. Typically, after a reset or reboot, the user re-establishes connectivity by performing a delayed reload of a HTTP page, resulting in invoking a new TCP connection at some point in the future. However, in many cases invoking a new TCP connection forces a re-authentication of the client-host session. Re-authentication can be problematic. For example, when the authentication uses a two-factor mechanism and the user is required to input a special code from a hardware password device, re-authentication is undesirable and time-consuming.

FIG. 1A is a block diagram of an example network arrangement for an embodiment. A client 104 is linked to a network 106, which is linked to a host 108. As an example, client 104 comprises any end station networking device such as a personal computer, workstation, printer, etc. Host 108 comprises a network infrastructure device such as a router, switch, or server. Network 106 may comprise a local area network, wide area network, internetwork, or combination thereof.

Figure 1B:
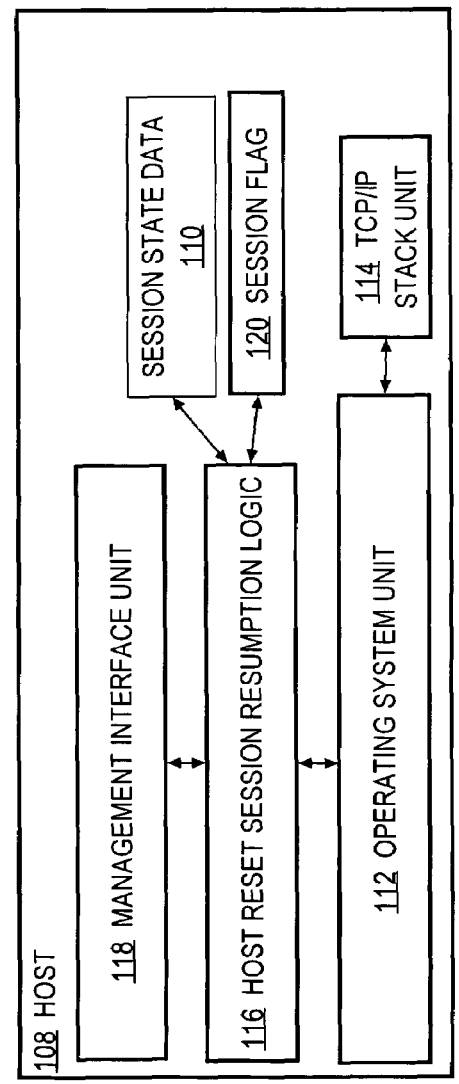
FIG. 1B is a block diagram of an example host device according to an embodiment.

FIG. 1B is a block diagram of an example host device according to an embodiment. Host 108 comprises an operating system unit 112, TCP/IP stack unit 114, host reset session resumption logic 116, management interface unit 118, session state data 110, and session flag 120. The operating system unit 112 comprises supervisory logic for controlling hardware and supervising operation of higher-layer logic. The operating system unit 112 may include or may be coupled to the TCP/IP stack unit 114, which comprises logic that implements the TCP protocol and IP protocol.

Figure 2A:
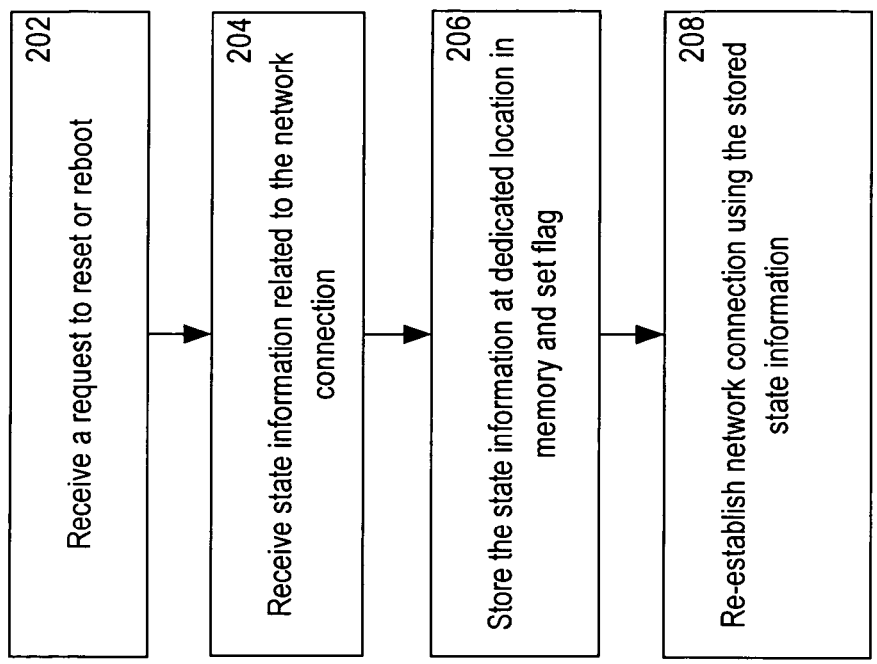
FIG. 2A is a flow diagram of one embodiment of a method for re-establishing a network session connection.
Figure 2B:
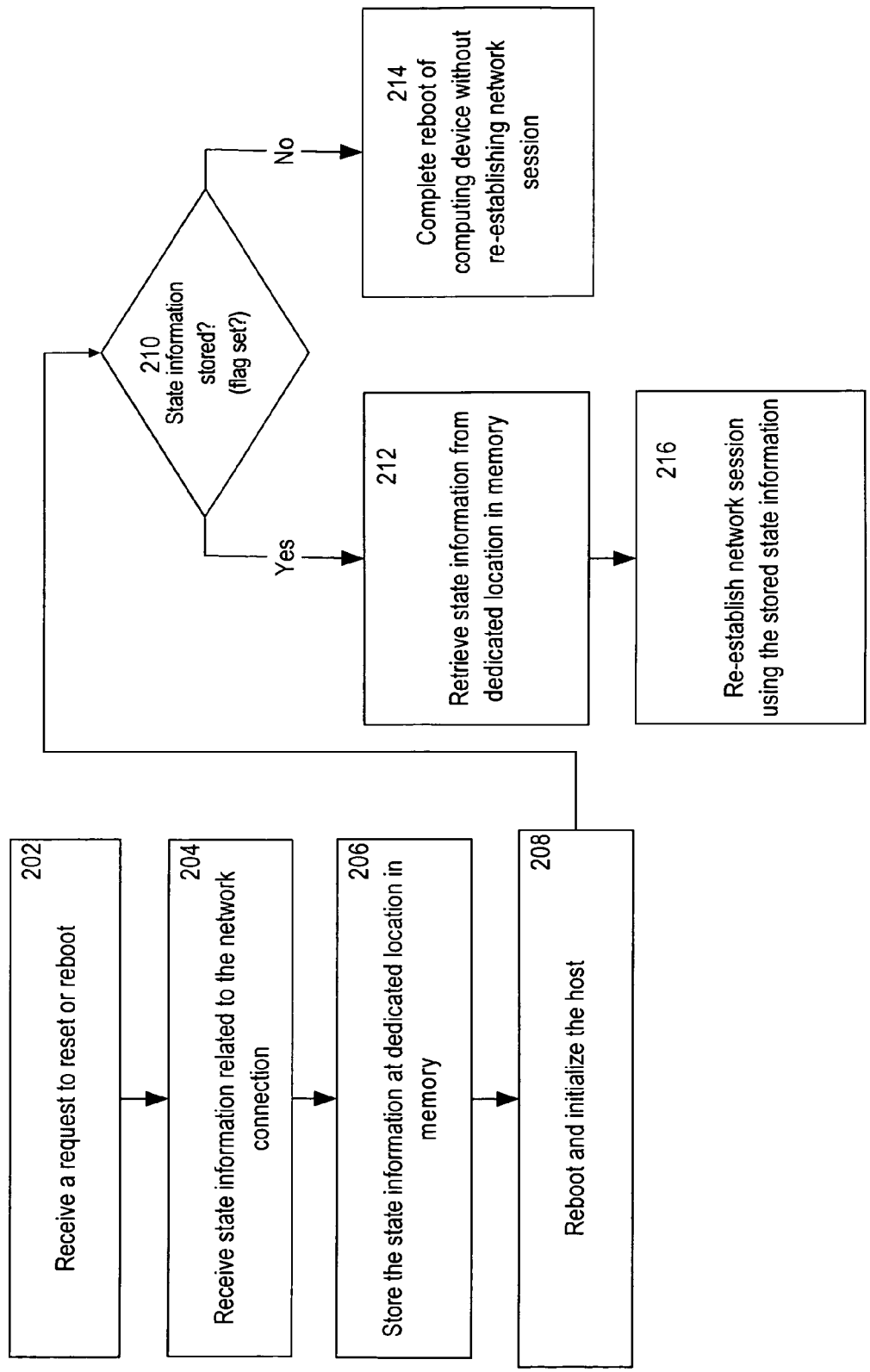
FIG. 2B is a flow diagram of another embodiment of the method of FIG. 2A.

The host reset session resumption logic 116 comprises logic for implementing the transparent session resumption functions that are described further herein in connection with FIG. 2A, FIG. 2B. The host reset session resumption logic 116 is coupled to session state data 110 and session flag 120, which may be stored in main memory, non-volatile system memory such as FLASH memory, disk storage, or any other suitable location.

The host reset session resumption logic 116 is coupled to operating system unit 112 and TCP/IP stack unit 114 and configured to operate early in a reboot sequence of the host 108. For example, after host 108 reboots or resets, and shortly after bringing up TCP/IP stack unit 114 to normal operation, the operating system unit 112 and/or TCP/IP stack unit 114 contact or invoke the host reset session resumption logic 116 to determine whether a previously established session should be resumed. Techniques for resumption are described further below with respect to FIG. 2A, FIG. 2B.

Management interface unit 118 receives and parses commands to host 108. For example, in operation, management interface unit 118 receives and parses a reboot or reset command from client 104 and invokes host session resumption logic 116 using the techniques described further below. The management interface unit 118 may be a part of the operating system unit 112.

In one embodiment, a method is provided for transparently resuming the network session between the client 104 and the host 108 across the network 106 after the host performs a reset or reboot. FIG. 2A is a flow diagram of one embodiment of a method for re-establishing a network session connection; FIG. 2B is a flow diagram of another embodiment of the method of FIG. 2A. Referring first to FIG. 2A, in step 202 a device such as host 108 receives a request for a reboot or reset of the host. In response to the request, at step 204 the host retrieves the state of a network connection between the host and a client that has issued the request. Thus, the process of FIG. 2A assumes that a session under a data communication protocol such as TELNET, using an underlying transport-layer connection of a protocol such as TCP, is previously established between the host and a client.

In step 206, the state information is stored. In one embodiment, step 206 comprises setting the session flag 120 indicating that other state information 110 for an existing network session has been stored. State information 110 may comprise IP connection state, TCP connection state, and/or state data for higher-layer protocols such as SSH or SSL. For a TELNET session using SSH over TCP, state information 110 may comprise TCP connection information such as sequence numbers, window size values, version number, protocol number, port numbers, etc.; secure session information for SSH or SSL, such as dynamic keys that are used to protect or encrypt the session; connection authorization state (e.g., privileged mode); and context-specific information, if available.

In one embodiment, flag 120 and state information 110 are stored in a specified location in memory. Flag 120 and state information 110 may be stored in RAM, non-volatile memory such as FLASH, disk, etc. Typically a non-initialized section of RAM is used. The particular form of storage is not critical, and any specified location in memory that is not initialized or corrupted upon a reboot can be used to store the state information. The term "specified location" means a location for which the functional units of FIG. 1B are configured to find the state information after a reboot or reset operation. For example, the specified location may be "well-known" RAM addresses.

In most hosts, performing a reset or reboot does not erase all memory. For example, a "warm reboot" operation in Cisco routers and switches typically does not erase the contents of main memory. Therefore, flag 120 and state information 110 are preserved. When the process of FIG. 2A is implemented in a system that does erase system memory during a reset or reboot, step 206 can be configured to store the flag 120 and state information 110 in nonvolatile memory, such as FLASH or disk.

At some point after step 206, the host performs the reset operation or reboot operation that was requested in step 202. At step 208, upon initiating or completing the reset or reboot operation, and before the TCP connection times out, the host re-establishes the connection that was in existence at step 202, using the stored state information. Step 208 may involve detecting that the flag 120 is set, retrieving state information 110, creating a transmission control block (TCB), and storing the state information 110 in the TCB to support the TCP connection. Step 208 also may involve creating other data structures that support higher-layer protocols such as TELNET and storing state information in the other data structures. Thus, step 208 may involve resuming data communications over an existing connection based on the stored state information.

Step 208 also may involve sending a KEEPALIVE packet or similar message to inform the other endpoint that the host is available, just in case the protocol timeout interval is nearly complete. Step 208 may be repeated for several different protocols represented in the state information 110. Step 208 may occur after a reboot is completed, or after a reboot is initiated and before the reboot completes. Step 208 may involve requesting the operating system or TCP/IP stack to resume or continue communication on a connection based on the data structures identified above or based on the retrieved state information.

As a result, the host automatically reestablishes all previous protocol connections between the host and other devices. From the standpoint of the user, a reset or reboot operation occurs and the user does not lose connectivity under TELNET, TCP, or other protocols. Further, the user is not required to re-authenticate to the device after a reset or reboot. The user may also achieve a perception of better connectivity or uninterrupted connectivity to the host.

Referring now to FIG. 2B, in another embodiment, a method involves performing steps 202, 204, 206 as previously described, and performing a reboot and initialization of the host at step 208. At step 210, the device determines whether state information was stored, indicating re-establishment of a network session is required. For example, determining whether state information has been stored involves testing whether the flag 120 is set.

If the test of step 210 is affirmative, then in step 212 the device retrieves the stored state information from the specified location in memory. In step 216, the device applies the stored state information to the existing network connection to transparently re-establish the previously existing session.

If the test of step 210 is negative, such that no state information has been stored, then the host completes a conventional reboot operation, without re-establishing any network session.

In an alternative embodiment, after the reboot and before the TCP connection has timed out, a client coupled to the host sends a signal that forces the host to check for stored state information. If the host determines that stored state information exists, then the state information is retrieved from memory and applied transparently to the TCP connection to re-establish a client-host session.

According to one embodiment, the reboot and resumption of the network connection described herein occur before the network connection times out. The time available to perform a reset of the host and to resume a client-host session is termed the retransmission timeout of the connection. The retransmission timeout is determined based on a number of factors, such as the amount of time to receive a message from the client, the round trip message response time, message response time variances, etc.

In one embodiment, during the reboot process but before the network connection has been reestablished, the host sends a message to the client that prevents the connection from timing out. For example, the host sends a KEEPALIVE or similar message early in the reboot process and before testing for state information at step 210. Alternatively, the host sends a KEEPALIVE or similar message just before step 210 or as part of step 210 or step 212. As a result, the network connection does not time out before the device has re-established a session using the complete process of FIG. 2B.

Embodiments can also provide protection against interruption of remote updates of hosts. For example, assume that a user is updating the operating system or firmware of the host using an FTP data transfer, and the host crashes during the updating and before the updating is complete. During the updating, the updated firmware is stored in nonvolatile memory such as FLASH memory, and the host operates using a software image that is stored in main memory such as RAM. In conventional practice, after the host resets or reboots following such a crash, the host attempts to load a new software image from the nonvolatile memory and to restart using that software image. However, under the foregoing scenario, the nonvolatile memory is incomplete or corrupted, and therefore the device cannot restart properly and the FTP connection cannot resume, even though the software image in main memory is usually unaffected by the restart or reboot and could be used.

In an embodiment herein, after restarting the host checks to determine whether a coherent operating system image is located in main memory, rather than nonvolatile memory. If main memory has a coherent operating system image, then the host continues operating with that operating system image and does not load a new image from nonvolatile memory. Further, the host retrieves the stored connection state information, creates data structures to support the previous FTP connection, populates the data structures based on the stored connection state information, and resumes the FTP transfer. As a result, the client and user maintain connectivity to the host, and the FTP transfer can complete the update process.

Embodiments may be used with many kinds of hosts. As a specific example, an IP phone may implement the preceding process; if the IP phone crashes, the IP phone can reboot and resume handling a call before a connection to a remote caller times out. Therefore, calling parties do not perceive a long interruption of the call or a dropped call.

As another example, a host may be a wireless end station such as a laptop PC with a wireless network interface. If the wireless end station loses association with an access point for a brief period, the wireless network interface may inform the TCP/IP stack that connectivity has been lost. In response, the stack may send an error message to an application such as HTTP, which may abort the TCP/IP connection and tear down related data structures. Further, a remote endpoint such as a server that is providing an HTTP response may detect loss of the connection and reset a related session. In an embodiment, the interface does not report the loss of connectivity until after TCP or higher-layer protocols would normally time out. Therefore, the network interface driver and local protocol stack can re-associate and resume the connection without another endpoint such as a server experiencing a connection loss.

3.0 Implementation Mechanisms—Hardware Overview

Figure 3:
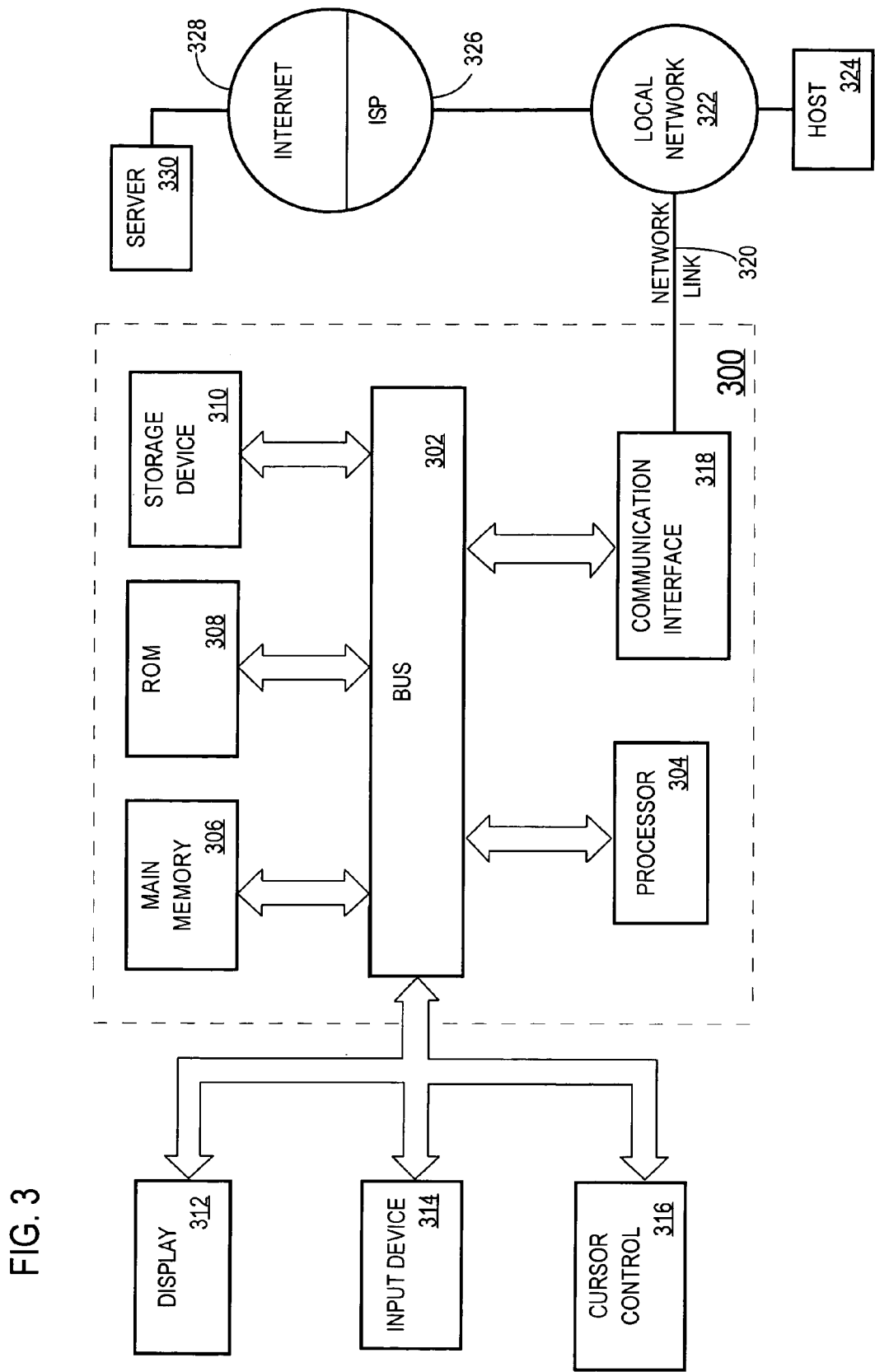
FIG. 3 is a block diagram that illustrates a computer system upon which an embodiment may be implemented.

FIG. 3 is a block diagram that illustrates a computer system 300 upon which an embodiment of the invention may be implemented. The preferred embodiment is implemented using one or more computer programs running on a host such as a server. Alternatively, the techniques herein may be implemented in routers, switches, etc. At a high level, such routers and switches have structure similar to that shown in FIG. 3, but also include a packet switching or forwarding system, and may omit certain I/O apparatus such as a keyboard and pointing device.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory ("RAM") or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory ("ROM") 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube ("CRT"), for displaying information to a computer user. An input device 314, including alphanumeric and other keys, is coupled to bus 302 for communicating information and command selections to processor 304. Another type of user input device is cursor control 316, such as a mouse, trackball, stylus, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for resuming a computing session when rebooting a computing device. According to one embodiment of the invention, resuming a computing session when rebooting a computing device is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector can receive the data carried in the infrared signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network ("ISDN") card or a modem to provide a data communication connection to a corresponding type of telephone line. As another example, communication interface 318 may be a local area network ("LAN") card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider ("ISP") 326.

ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for resuming a computing session when rebooting a computing device as described herein.

The received code may be executed by processor 304 as it is received, and/or stored in storage device 310, or other non-volatile storage for later execution. In this manner, computer system 300 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-implemented method, comprising:
   creating and storing state information comprising one or more parameters for a network connection between a first computing device and a second computing device;
   receiving a request to reboot the first computing device;
   wherein the request is received over the network from the second computing device;
   in response to the request, storing the state information in a particular location in a memory of the first computing device;
   initiating a reboot of the first computing device;
   retrieving the state information from the particular location in memory;
   resuming data communications over the network connection based on the retrieved state information.

2. The method of claim 1 wherein storing the state information comprises setting a flag that specifies that the stored state information is stored, and further comprising determining whether the state information is stored based on testing whether the flag is set.

3. The method of claim 1, further comprising receiving a signal from the second computing device after performing the reboot of the first computing device, and performing the retrieving and resuming only in response to receiving the signal.

4. The method of claim 1 wherein the storing, performing, retrieving and resuming are performed before a timeout period of a network protocol that is used for the network connection.

5. The method of claim 1, wherein the storing step comprises storing the state information in a particular location in RAM that is not erased during the performing of the reboot.

6. The method of claim 1, further comprising sending a KEEPALIVE message after receiving the request.

7. The method of claim 1, wherein the steps are performed in any one of a router, switch, server, IP phone and a communicating device that performs stateful connection services.

8. The method of claim 1, wherein resuming comprises creating a TCP control block and storing the one or more parameters of the retrieved state information in the TCP control block.

9. The method of claim 1 wherein the state information includes any one of a transport layer protocol layer state, a SSH protocol layer state, a SSL protocol layer state and any other stateful communications protocol.

10. A data processing apparatus, comprising:
    an operating system unit configured to create and store state information comprising one or more parameters for a network connection between a first computing device and a second computing device;
    a management interface unit configured to receive a request to reboot the first computing device;
    wherein the the request to reboot the first computing device is received from the second computing device over the network connection; and
    host reset session resumption logic configured to store, in response to the request, the state information in a particular location in a memory of the first computing device, to initiate a reboot of the first computing device, to retrieve the state information from the particular location in memory, and to request resuming data communications over the network connection based on the retrieved state information.

11. The apparatus of claim 10 wherein the operating system unit is configured to set a flag that specifies that the stored state information is stored, and wherein the host reset session resumption logic is configured to determine whether the state information is stored and to test whether the flag is set.

12. The apparatus of claim 10, wherein the host reset session resumption logic is configured to receive a signal from the second computing device after initiating the reboot of the first computing device, and wherein the host reset session resumption logic is configured to retrieve and to request resuming only in response to receiving the signal.

13. The apparatus of claim 10 wherein the host reset session resumption logic is configured to store, retrieve and resume before a timeout period of a network protocol that is used for the network connection.

14. The apparatus of claim 10, wherein the host reset session resumption logic is configured to store the state information in a particular location in RAM that is not erased during the performing of the reboot.

15. The apparatus of claim 10, wherein the host reset session resumption logic is configured to send a KEEPALIVE message after receiving the request.

16. The apparatus of claim 10, comprising any one of a router, switch, server, IP phone and a communicating device that performs stateful connection services.

17. The apparatus of claim 10, wherein the host reset session resumption logic is configured to request creating a TCP control block and to store the one or more parameters of the retrieved state information in the TCP control block.

18. The apparatus of claim 10 wherein the state information includes any one of a transport layer protocol layer state, a SSH protocol layer state, a SSL protocol layer state and any other stateful communications protocol.

19. An apparatus, comprising:
    means for creating and storing state information comprising one or more parameters for a network connection between a first computing device and a second computing device;

means for receiving a request to reboot the first computing device;

means for storing, in response to the request, the state information in a particular location in a memory of the first computing device;

means for initiating a reboot of the first computing device;

means for retrieving the state information from the particular location in memory;

means for resuming data communications over the network connection based on the retrieved state information.

20. The apparatus of claim 19 wherein the means for storing the state information comprises means for setting a flag that specifies that the stored state information is stored, and further comprising means for determining whether the state information is stored based on testing whether the flag is set.

21. The apparatus of claim 19, comprising means for receiving the request to reboot the first computing device from the second computing device over the network connection.

22. The apparatus of claim 19, further comprising means for receiving a signal from the second computing device after performing the reboot of the first computing device, and means for performing the retrieving and resuming only in response to receiving the signal.

23. The apparatus of claim 19 wherein functions of the means for storing, performing, retrieving and resuming are performed before a timeout period of a network protocol that is used for the network connection.

24. The apparatus of claim 19, wherein the means for storing step comprises means for storing the state information in a particular location in RAM that is not erased during the performing of the reboot.

25. The apparatus of claim 19, further comprising means for sending a KEEPALIVE message after receiving the request.

26. The apparatus of claim 19, comprising any one of a router, switch, server, IP phone and a communicating device that performs stateful connection services.

27. The apparatus of claim 19, wherein the means for resuming comprises means for creating a TCP control block and storing the one or more parameters of the retrieved state information in the TCP control block.

28. The apparatus of claim 19 wherein the state information includes any one of a transport layer protocol layer state, a SSH protocol layer state, a SSL protocol layer state and any other stateful communications protocol.

29. A computer-readable storage medium encoded with logic for resuming a computing session when rebooting a computing device, which logic when executed by one or more processors, causes performing:

creating and storing state information comprising one or more parameters for a network connection between a first computing device and a second computing device;

receiving a request to reboot the first computing device;

wherein the request to reboot the first computing device is sent over the network from the second computing device;

in response to the request, storing the state information in a particular location in a memory of the first computing device;

initiating a reboot of the first computing device;

retrieving the state information from the particular location in memory;

resuming data communications over the network connection based on the retrieved state information.

30. The computer-readable medium of claim 29 wherein the logic which when executed causes storing the state information comprises logic which when executed causes setting a flag that specifies that the stored state information is stored, and further comprising logic which when executed causes determining whether the state information is stored based on testing whether the flag is set.

31. The computer-readable medium of claim 29, further comprising logic which when executed causes receiving a signal from the second computing device after performing the reboot of the first computing device, and logic which when executed causes performing the retrieving and resuming only in response to receiving the signal.

32. The computer-readable medium of claim 29 wherein the logic which when executed causes storing, performing, retrieving and resuming completes executing before a timeout period of a network protocol that is used for the network connection.

33. The computer-readable medium of claim 29, wherein logic which when executed causes storing comprises logic which when executed causes storing the state information in a particular location in RAM that is not erased during the performing of the reboot.

34. The computer-readable medium of claim 29, further comprising logic which when executed causes sending a KEEPALIVE message after receiving the request.

35. The computer-readable medium of claim 29, wherein the logic is coupled to any one of a router, switch, server, IP phone and a communicating device that performs stateful connection services.

36. The computer-readable medium of claim 29, wherein the logic which when executed causes resuming comprises logic which when executed causes creating a TCP control block and storing the one or more parameters of the retrieved state information in the TCP control block.

37. The computer-readable medium of claim 29 wherein the state information includes any one of a transport layer protocol layer state, a SSH protocol layer state, a SSL protocol layer state, or any other stateful communications protocol.

* * * * *